US005492240A

United States Patent [19]
Vilutis

[11] Patent Number: 5,492,240
[45] Date of Patent: Feb. 20, 1996

[54] FULL PERIMETER CONFORMING LINER

[75] Inventor: Leonard J. Vilutis, Frankfort, Ill.

[73] Assignee: Vilutis & Co., Inc., Frankfort, Ill.

[21] Appl. No.: 196,428

[22] Filed: Feb. 15, 1994

[51] Int. Cl.⁶ ................................................ B65D 90/04
[52] U.S. Cl. ........................................ 220/404; 220/470
[58] Field of Search ................................ 220/404, 403, 220/470

[56] References Cited

U.S. PATENT DOCUMENTS

| | | |
|---|---|---|
| 430,195 | 6/1890 | Reimers ................................ 220/404 |
| 1,941,871 | 1/1934 | Struve . |
| 2,298,419 | 10/1942 | Salfisberg . |
| 2,429,538 | 10/1947 | Wood . |
| 2,932,575 | 4/1960 | Scion et al. . |
| 2,998,340 | 8/1961 | Conway et al. . |
| 3,142,437 | 7/1964 | Grant et al. . |
| 3,262,629 | 7/1966 | Murphy et al. . |
| 3,939,972 | 2/1976 | Mayworm . |
| 3,969,995 | 7/1976 | Krueger et al. . |
| 3,987,959 | 10/1976 | Deards et al. . |
| 4,269,247 | 5/1981 | Omdal . |
| 4,444,355 | 4/1984 | Cary ...................................... 220/404 |
| 4,450,028 | 5/1984 | Vilutis . |
| 4,478,351 | 10/1984 | Homma . |
| 4,558,801 | 12/1985 | Vilutis . |
| 5,031,792 | 7/1991 | Russo, Sr. ............................. 220/403 |
| 5,211,305 | 5/1993 | Horton .................................. 220/404 |
| 5,287,981 | 2/1994 | Wheeler ................................ 220/1.5 |

Primary Examiner—Stephen J. Castellano
Attorney, Agent, or Firm—Lockwood, Alex, Fitzgibbon & Cummings

[57] ABSTRACT

A film liner is provided in the form of a sleeve having at least four conforming seal areas provided on the sleeve that joins at least four adjacent panels of the sleeve along a location that is spaced inwardly from the edges of the sleeve, and the conforming seal areas each have a length that is less than the length of the edge from which it is inwardly spaced. When the full perimeter conforming liner according to this invention lines a container, such as a cheese-making box, including a so-called Arena box, two mouths of this liner form cuffs over the peripheral edge of the container. When thus used, the interior surface has a lining surface that engages the full perimeter of the box such that the liner walls flatly overlie the box walls and the respective corner portions of this lining surface overlie and engage all of the vertical corners of the box.

20 Claims, 3 Drawing Sheets

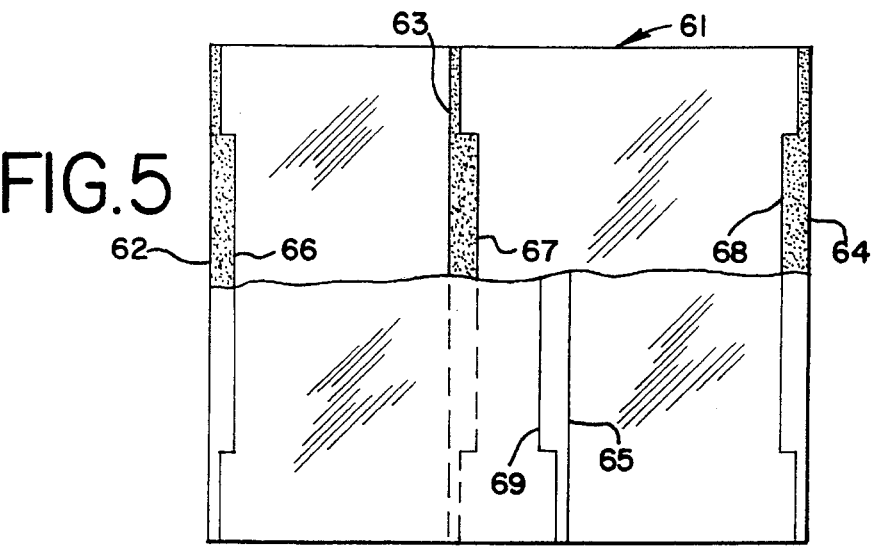
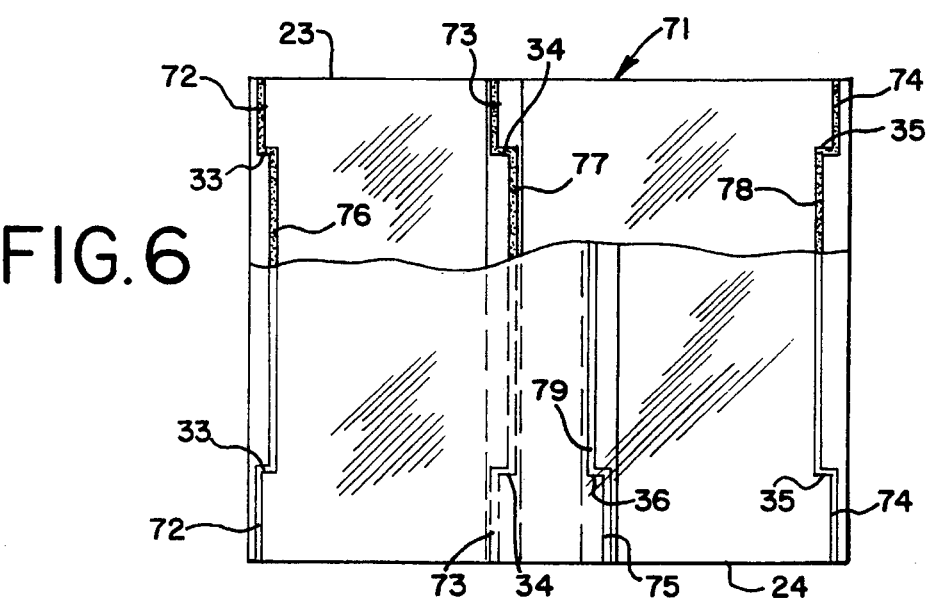
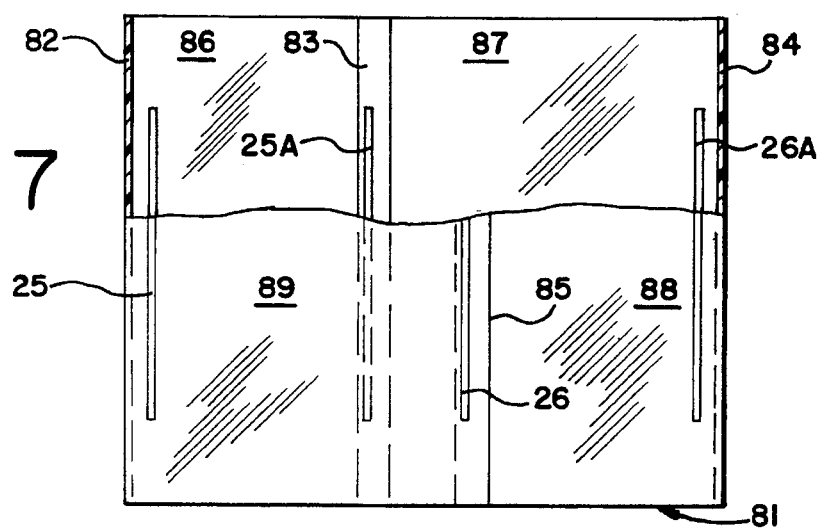

FULL PERIMETER CONFORMING LINER

BACKGROUND AND DESCRIPTION OF THE INVENTION

This invention generally relates to liners for containers, more particularly to flexible liners that closely conform to the full perimeter of the inside walls of self-supporting containers. Such conforming liner includes a plurality of conforming seals each having a length substantially the same as the height of the vertical walls of the container, each conforming seal being spaced laterally from an edge of the liner. When the liner is installed within the container, each edge of the liner remains between the liner and the container, and each conforming seal defines a corner that is adapted to closely overlie and engage a vertical corner of the self-supporting container.

Utilization of flexible liners for providing readily releasable surfaces along the inside panels of free-standing containers has been well-known for many years. Included is the use of open-mouth polymeric film liners or bags for providing a continuous inner surface for boxes of various products, including chemicals, foods and other products, wherein the liner provides a layer of material along the inside surface of the container, box or the like. A particular application along these lines is in connection with cheese-making operations. Many cheese products are made within large containers, generally known as "Tosca boxes" which are designed to provide a bulk cheese-making container to make a block of cheese weight approximately 640 pounds.

Generally speaking, a Tosca box type of container is a four-sided wooden or metal sleeve. With cheesecloth enclosing the bottom of this structure, cheese curd is poured into the box, and the whey is pressed from the curd and through the cheesecloth. The open top of the box or container is then closed with a suitable lid, and the thus closed container is stored or shipped for further processing and/or packaging. After the cheese has set for the desired length of time, the walls of the container or box are separated from each other and from the cheese that has set therewithin. At this stage, it is important that the walls of the container or box be flat and adequately releasable from the set cheese so that the cheese block will have sides that are relatively smooth and undamaged. Traditionally, such releasability had been provided by waxing the inside walls of the container or box, but this procedure is quite labor intensive. In more recent years, the wax has been replaced by a flexible film liner.

Widely used flexible film liners in this regard take the form of cylindrical film sleeves or tubes that generally line the inside surface of the container or box. These types of sleeve liners have a height that is somewhat greater than the height of the container or box, whereby the sleeve is folded over a mouth-defining peripheral edge of the container and over a portion of an outside surface of the container in order to form a liner cuff or overlap that is several inches in length and that assists in holding the liner in place. Usually, this cuff arrangement is provided on both the top periphery and the bottom periphery of the container or box.

The principal difficulty with these generally cylindrical sleeve or tube liners is that, in order to provide enough film to permit liner fold over and cuff formation, the perimeter of the sleeve is greater than the inside perimeter of the container or box. As a result, in the case of cheese making, before the cheese curd is poured into the box, the worker must carefully fold the liner so that its excess perimetrical film material will lie flat against the inside surface of the box while, and hopefully after, the cheese curd is filled into the container or box. This is exceedingly difficult to accomplish due to the flexibility of the liner material and the shifting thereof that occurs while the curd is poured into the box and up against the liner. If, as is all too often the case with these types of liners, the cheese curd flows into pockets formed in the liner by the excess perimetrical film material, the set cheese will likewise form within these pockets. When the liner is removed for subsequent processing, cutting and/or packaging of its cheese block, a portion of the cheese block at or in the vicinity of these pockets often breaks away thereby losing cheese weight and damaging the appearance of the cheese block and reducing the total yield of commercially acceptable product that is obtained from each block when it is cut into smaller blocks.

One advantage of these prior art liners is that they are relatively inexpensive because of their substantially simple construction. Inexpensiveness is an important attribute and necessary feature of these types of liners inasmuch as they are not reused and are looked upon as a disposable item that cannot be particularly elaborate or expensive to manufacture.

An improvement upon these cylindrical film sleeves or tubes is represented by my U.S. Pat. No. 4,558,801 which discloses a conforming liner having a conforming seal area. Conforming liners of this type have significant advantages over the liners which preceded it. Experience with the conforming liners specifically described in U.S. Pat. No. 4,558,801 has indicated these liners do not conform to the full perimeter of the box in many applications. For example, the liner can be spaced away from the box, especially in corner areas, and undesirable bunching or folding over of the liner has been experienced along the areas between the corners.

In addition, the so-called Tosca boxes are being replaced by more modern containers. For example, in the cheese-making industry so-called Arena boxes have come into use. These are boxes of molded polymer panels that have a somewhat waffle-like texture. Boxes of this type include those available from A.R.Arena Products, Inc., which have walls containing horizontal and vertical spaced ribs that define open spaces so as to reduce the weight of the box while enhancing the rigidity. Plastic panel boxes of this style have panel walls that are substantially thicker than those used in the past. For example, a wooden-walled Tosca box typically is made of three-quarter inch plywood. More recently used stainless steel boxes have wall thicknesses on the order of three-quarters of an inch to one inch. Waffle-walled plastic boxes such as Arena boxes have a wall thickness of at least about one and one-quarter inch. The thicker-walled boxes increase the difficulty of having the liner conform as closely as possible to the inside surface of the box because of the need in all boxes to have a cuff portion that folds over the open end of the box to properly hold the liner in place. Thicker box walls require the cuff to fold over a greater length, thereby complicating the design of the liner so as to accommodate this longer cuff span.

Accordingly, there is a need for an inexpensive liner that is easily installed and maintained in position within a container or box, even when the container or box is of the thicker-walled variety and when it is being filled with a flowable material such as cheese curd and the like. Such needs are satisfied by the present invention which provides a liner having an inside surface that closely conforms to the full perimeter of the container or box being lined while still providing a mouth-defining portion having a periphery that is oversized to permit the formation of a cuff portion for folding over the lip of the box.

These desirable features and advantages are accomplished according to the present invention by providing a conforming liner that is a sleeve-like member having a cuff portion periphery which is greater than the periphery of the inside of the container or box to be lined and which conforming liner further includes at least four conforming seal areas that combine to define a sleeve-like member that emulates the shape and size of the full periphery of the inside of the container or box. Each conforming seal area is spaced from an edge of the cuff portion periphery and has a length which is substantially the same as the height of the container or box being lined.

It is accordingly a general object of the present invention to provide an improved liner for a container or box.

Another object of this invention is to provide an improved liner that closely conforms to the inside dimensions of the full perimeter of a container or box while including an extraordinarily sized peripheral edge portion that readily forms a cuff which overlies the peripheral edge of the container or box.

Another object of the present invention is to provide a full perimeter conforming liner that is inexpensive and that requires minimal effort to install and to maintain in place during filling of a box or container within which it is inserted.

Another object of the present invention is to provide an improved full perimeter conforming liner wherein the liner includes at least four sections of excess material which is maintained behind an inside surface of the conforming liner that lies flush along the inside surface of the container or box.

These and other objects of this invention will be apparent from the following detailed description thereof, taken in conjunction with the accompanying drawings, wherein:

FIG. 5 is a plan view, partially broken away, of an alternative embodiment of a collapsed liner according to this invention;

FIG. 6 is a plan view, partially broken away, of a further alternative embodiment of a collapsed liner according to this invention; and FIG. 7 is a plan view, partially broken away, of another alternative embodiment of a liner according to the invention, shown in a collapsed condition.

Figure 1:
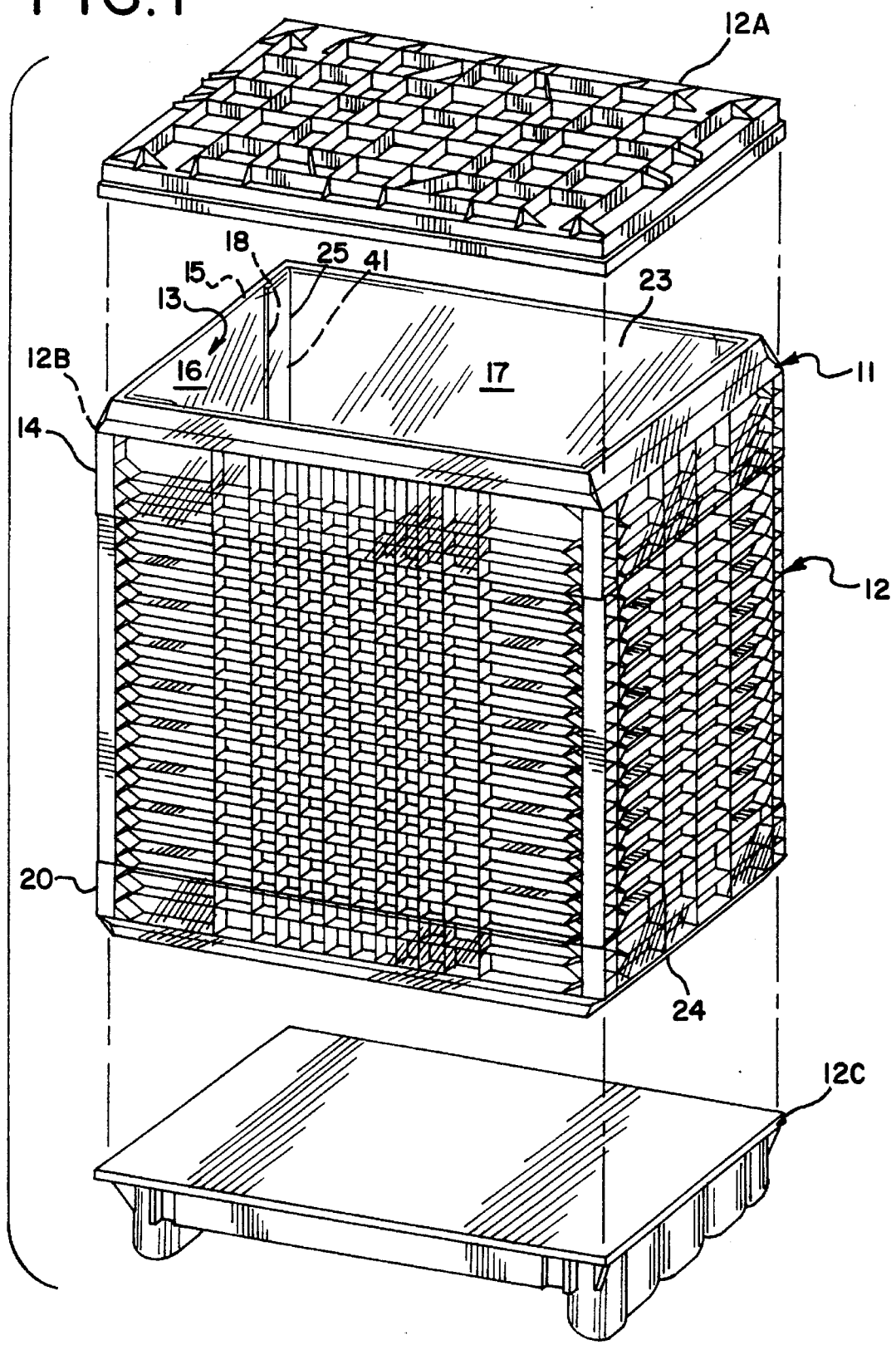
FIG. 1 is a perspective view of the preferred embodiment of the conforming liner according to this invention, shown assembled onto a container or box of the Arena box type.

A full perimeter conforming liner, generally designated as 11, is illustrated in FIG. 1 installed within a box or container, generally illustrated as 12. The illustrated container is of the Arena-box type having somewhat thick plastic walls with a plurality of intersecting ribs and free spaces generally therebetween. It also includes a top 12A having a lip area 10 that overlies the tapered top mouth portion 12B of the container. A bottom platform 12C is also illustrated.

Full perimeter conforming liner 11 includes an interior lining surface 13 and upper cuff portions 14. The interior lining surface 13, when the liner 11 is installed as shown in FIG. 1, fully conforms to the shape and dimensions of the interior walls of the container 12, while each cuff portion 14 extends from the interior lining surface 13 and folds over a peripheral edge 15 and the top mouth portion 12B of the box or container 12 so as to generally overlie a portion of the outside surface of the box or container 12 that is adjacent to the peripheral edge 15. The top 12A then overlies at least a portion of the mouth 12B.

Figure 2:
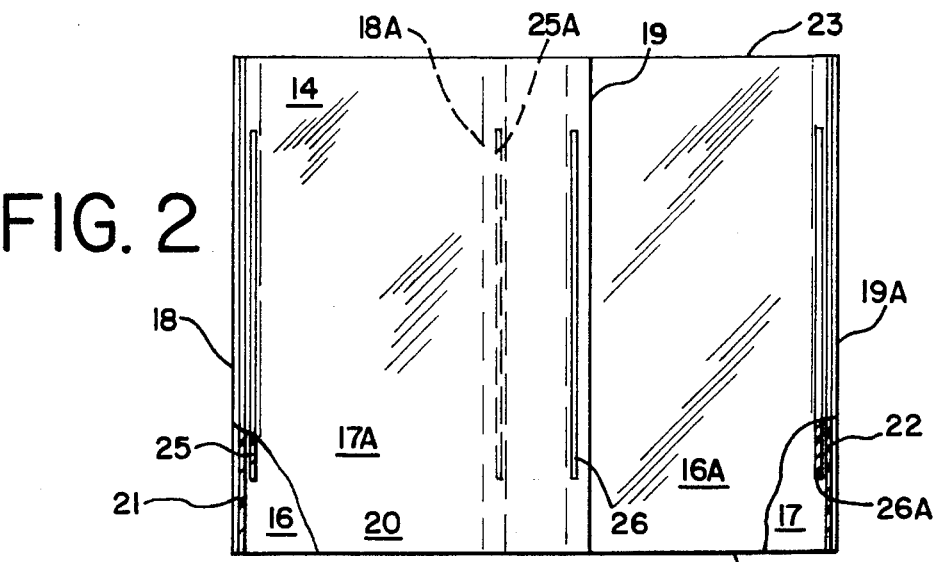
FIG. 2 is a plan view, partially broken away, of the conforming liner of FIG. 1, shown in a flattened or collapsed condition.
Figure 3:
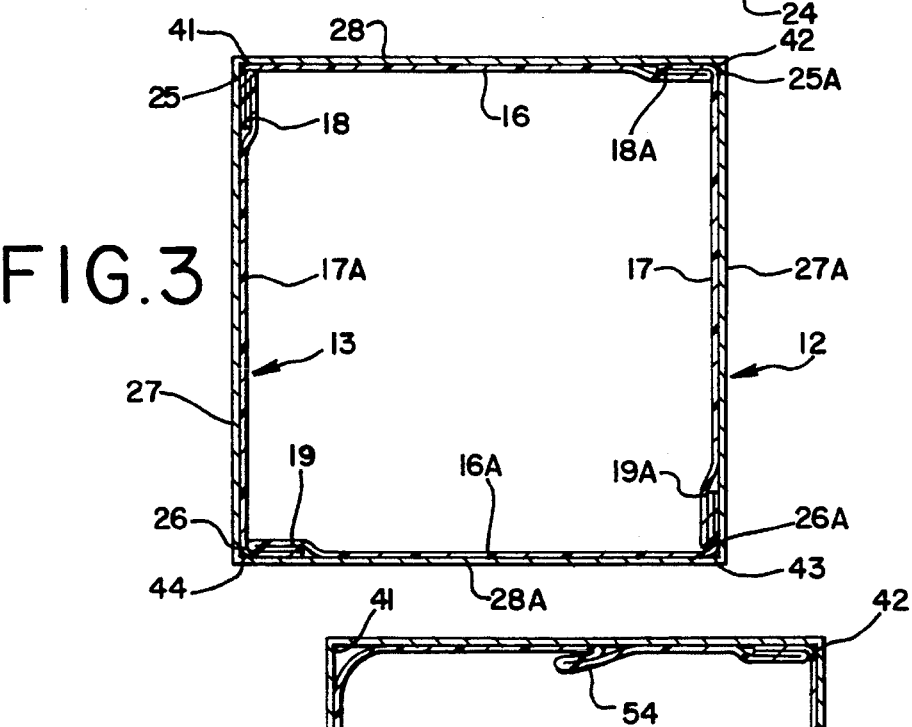
FIG. 3 is a horizontal sectional view through the full periphery conforming embodiment of FIG. 1.

With more particular reference to the conforming liner 11, FIGS. 1 through 3 illustrate the preferred embodiment thereof. FIG. 2 shows same in a collapsed or generally flattened condition prior to installation. Included are opposing first panels 16 and 16A which are of generally equal length and height. Also shown are opposing second panels 17 and 17A, which are also of generally equal length and height. The height of each panel 16, 16A, 17, 17A is the same, while panels 17, 17A are longer than panels 16, 16A in the illustrated embodiments. Panels are either assembled together or are integrally formed together. However they are joined together, they alternate as panels 16, 16A, 17, 17A to define the full perimeter lining surface having joined-together adjacent edges 18, 18A, 19, 19A. In this embodiment, the joined-together opposing edges 18 and 19A each include a seal line 21, 22. An unsealed mouth 23 extends between and is defined by the joined-together adjacent edges 18, 18A, 19, 19A. Cuff portion 14 is partially defined by the lip of the unsealed mouth 23, and this embodiment includes another unsealed mouth 24 and cuff portion 20.

A conforming seal 25, 25A, 26, 26A is spaced inwardly of each of the joined-together adjacent edges. Additionally, the conforming seals each have a length that is less than the height of the panels 16, 16A, 17, 17A and in this embodiment also less than the length of the joined-together adjacent edges 18, 18A, 19, 19A. This shorter length is positioned such that the conforming seals 25, 25A, 26, 26A assist in defining the cuff portions 14, 20. Conforming seals 25, 25A, 26, 26A define the perimeter and height of the interior lining surface 13 to be the same as the perimeter and height of the interior walls of the box or container 12.

Because of this structure, when the full perimeter conforming liner 11 is installed within the box or container 12 as shown in FIG. 1, the interior lining surface 13 is readily positioned to closely conform in size and shape to the size and shape of the interior walls of the box or container 12. In this regard, it is particularly important to note that any excess paneling materials, including surplus film sections that are located outwardly of the conforming seals will, when installed, remain between the conforming liner 11 and the walls of the box or container 12. Materials such as cheese curd and the like that are filled into the thus lined box or container 12 will contact only the interior lining surface 13 of the full perimeter conforming liner and will not contact these surplus film sections.

Interior lining surface 13 is defined between the conforming seals 25, 25A, 26, 26A to coincide with the size and shape of the interior periphery of the box of container 12. A typical container 12 is rectangular in horizontal cross-section, with first opposing walls 27, 27A having an identical first length and second opposing walls 28, 28A having an identical second length. Each panel of the interior lining surface 13 has a length that substantially corresponds to the length of one of the walls 27, 27A, 28, 28A of the container. For example, in a typical container 12, wall 27 has a length, the first length mentioned above, of about 28 inches, and the length between conforming seal 25 to conforming seal 26 of a liner 11 for this container is about 28 inches ± one-half inch. This same relationship applies to the length of the container wall 27A (also the first length) and the length between conforming seals 25A and 26A. This same container, for example, has a wall 28 having a length of about 22 inches, which is the second length, and the corresponding interior lining surface panel between conforming seals 25 and 25A, has a length of about 22inches ± one-half inch. This same relationship applies to the length of the container wall 28A (also the second length) and the length between conforming seals 26 and 26A.

With an interior lining surface 13 having this type of type of full-perimeter conformance with the interior surface of the container 12, each corner portion of this lining surface coincides with its respective corner of the container interior surface. In an especially preferred assembly arrangement as shown in the drawings, the corners of the lining surface are the conforming seals 25, 25A, 26, 26A, and they closely overlie respective container corners 41, 42, 43, 44, as can be seen in FIGS. 1 and 3.

Figure 4:
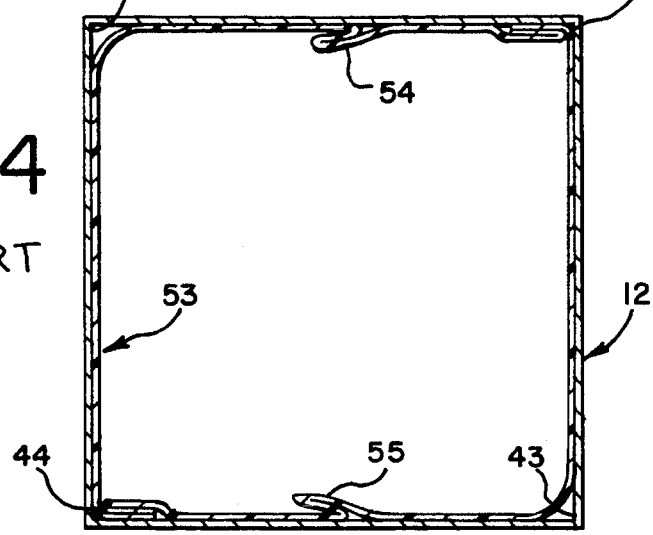
FIG. 4 is a sectional view as in FIG. 3 but of a liner not according to the present invention.

FIG. 4 illustrates the conforming attributes of the liner of U.S. Pat. No. 4,558,801. Especially to be noted is the relationship between the interior lining surface 53 of that liner and the corners 41, 43 of the container 12, which container is the same as container 12 of FIGS. 1 and 3. The lining surface 53 does not closely overlie these corners, but is spaced therefrom in an arcuate manner. When cheese or the like is molded with this arrangement, at least two of the vertical corners of the cheese block will not be squared-off, but will be rounded, reducing somewhat the volume and providing undesirable rounded edges of the resulting cheese block. Experience has also indicated that folds or wrinkles 54, 55 can develop in the lining surface 53, which folds or wrinkles often are not of uniform shape position and size throughout the height of the lining surface. This is contrasted with the lining surface 13 according to the present invention which, because of its full-perimeter conforming lining surface, is wrinkle-free when in use, thereby forming a cheese block, for example, in which all of its vertical walls are flat, squared-off and wrinkle-free.

It has also been found that, without the fully defined four-cornered structure of the present invention, it can be difficult to align the seals of the liner even with respect to corners 42, 44, which alignment is illustrated in FIG. 4. With the present invention, the liner 11 is inserted into the container 12, and the conforming seals 25, 25A, 26, 26A easily are lined up with the respective container corners 41, 42, 43, 44 before the cuff portions are folded over the edges of the open mouths of the container. This ensures proper alignment and an especially effective and full-perimeter conforming liner.

In the alternative embodiment illustrated in FIG. 5, the conforming liner 61 is similar to conforming liner 11 of FIGS. 1 through 3, except the respective seal lines at the joined-together adjacent edges 62, 63, 64, 65 extend to the conforming seals 66, 67, 68, 69 in order to form respective seal areas of therebetween.

FIG. 6 illustrates a further embodiment of a conforming liner 71. In this conforming liner 71, the conforming seals 76, 77, 78, 79 are substantially the same as shown on conforming liner 11. Joining seals 33, 34, 35, 36 generally connect the respective conforming seals 76, 77, 78, 79 with respective seal lines 72, 73, 74, 75 which extend from the respective joining seals 33, 34, 35, 36 to one of the unsealed mouths 23, 24. Seal lines 72, 73, 74, 75 join the film panels of the cuff portions 14, 20 so that the cuff portions 14, 20 remain in place in their folded-over installed position as shown in FIG. 1. Analogous features are provided in all of the embodiments illustrated herein so that the folded over cuff portions 14, 20 remain in place without the need for holding or tying members such as elastomeric bands.

The embodiment of the conforming liner 81 that is shown in FIG. 7 includes joined-together adjacent edges 82, 83, 84, 85 which are integral sections of a tube or sheath that had been formed by blow molding or the like. When the conforming liner 81 is generally collapsed as illustrated in FIG. 7, adjacent panels 86, 87, 88, 89 are defined between the joined-together adjacent edges.

Materials out of which the full perimeter conforming liner according to this invention is made will be selected in order to provide the properties needed for the particular intended use of the conforming liner. For example, when an oxygen barrier film is needed, which typically would be the situation in connection with the making of aged cheese, a multi-layered barrier film would be used. Exemplary of this type of multi-layered film is Saranex film (trademark of The Dow Company). Usually, these multi-layered film materials are three ply or five ply. For example, a crystalline copolymer of vinylidene chloride and vinyl chloride, the polymer being known as saran, can be integrally sandwiched between outer layers of low density polyethylene, which layers are typically extruded as a single film. The internal, sandwiched layer in this type of film is a high fluid barrier film, which is sandwiched between and protected by tough, extensible polyethylene films, often with an ethylene vinyl acetate film between the center film and both of the outer layers. These multi-layered films are especially useful since they are approved for use in connection with food and drug products.

When an oxygen barrier film is not needed, for example in connection with the making of cheese products that are not of the aged variety, the full perimeter conforming liner may be as simple as to be made of single layered sheets such as those of polyolefins including polyethylene, polypropylene and the like, whether or low, medium or high density. Also suitable, depending upon the intended use of the full perimeter conforming liners, are films made of materials such as ethylene vinyl acetate copolymers, polyamides, modified polymers such as polyethylene modified with polyisobutylene, coextrusions of a polyolefin and ethylene vinyl acetate, polyethylene terephthalates, Surlyn tubing, and the like.

With more particular reference to the preferred use of the full perimeter conforming liners in conjunction with cheese making operations, they are especially advantageous for lining the molded polymer Arena box illustrated in FIG. 1. After the cheese has been set, the top and bottom are taken off, and the cheese block is removed. A typical cheese making container or box for making a 640 pound block of cheese has a height of 28 inches, and has a periphery defined by a length of 28 inches and a width of 22 inches.

It is to be appreciated that this invention can be embodied in various forms and therefore is to be construed and limited only by the scope of the appended claims.

I claim:

1. A full perimeter conforming liner for lining and engaging the full perimeter of an inside surface of a self-supporting container having a plurality of adjacent vertical container walls, at least two opposing ones of said walls being of a first identical length, and two other opposing ones of said walls being of a second identical length, each adjacent two of said walls defining a vertical corner, all of the container walls having approximately the same predetermined height, the conforming liner comprising:

at least two first panels of film material having a length which is greater than said first identical length of the container walls;

at least two second panels of film material having a length which is greater than said second identical length of the container walls;

each of said first and second panels of film material having a selected height that is greater than the predetermined height of the container walls;

said panels of film material having joined-together adjacent edges thereof to form a sleeve-like member having an unsealed mouth and in which first panels alternate with second panels;

a first conforming seal spaced closely laterally from a first one of said adjacent edges, said first conforming seal sealing one of said first panels to one of said second panels to define a first surplus film section between said first conforming seal and said first adjacent edge;

a second conforming seal spaced closely laterally from a second one of said adjacent edges, said second conforming seal sealing said second panel having the first conforming seal to another of said panels of film material to define a second surplus film section between said second conforming seal and said second adjacent edge, the first and second conforming seals being spaced apart from each other by a distance substantially the same as said first identical length of the container walls;

a third conforming seal spaced closely laterally from a third one of said adjacent edges, said third conforming seal sealing said panel having the second conforming seal to another of said panels of film material to define a third surplus film section between said third conforming seal and said third adjacent edge, the second and third conforming seals being spaced from each other by a distance substantially the same as said second identical length of the container walls;

a fourth conforming seal spaced closely laterally from a fourth one of said adjacent edges, said fourth conforming seal sealing one of said second panels to said first panel having the first conforming seal to define a fourth surplus film section between said fourth conforming seal and said fourth adjacent edge;

each of the conforming seals having a length that is less than said selected height of said panels of film material, said length of each conforming seal also being approximately equal to the predetermined height of the container walls;

a cuff portion that extends in one direction between said adjacent edges, and said cuff portion extends in another direction from approximately an end of each of said conforming seals to said unsealed mouth, said cuff portion being substantially free of said conforming seals; and a lining surface of the conforming liner, said lining surface excludes said cuff portion and is defined by said panels of film material and includes each of said first, second, third and fourth conforming seals, said lining surface excludes first, second, third and fourth surplus film sections and said lining surface engages the full perimeter of the self-supporting container such that respective corner portions of the lining surface overlie and engage all of said respective vertical corners of the self-supporting container.

2. The full perimeter conforming liner according to claim 1, wherein the self-supporting container is rectangular in horizontal cross-section and has two opposing side walls having the first identical length and two other opposing side walls having the second identical length, and wherein said lining surface of the conforming liner is rectangular in horizontal cross-section and has two opposing said first panels having a length defined between adjacent conforming seals which is substantially the same as said first identical length of the container side walls, and said conforming liner also has two opposing said second panels having a length defined between adjacent conforming seals which is substantially the same as said second identical length of the container side walls.

3. The full perimeter conforming liner according to claim 1, further including another unsealed mouth and another cuff portion that extends between said adjacent edges, and said another cuff portion extends from approximately an opposite end of said conforming seals to said another unsealed mouth, said another cuff portion being substantially free of said conforming seals.

4. The full perimeter conforming liner according to claim 1, wherein said cuff portion is foldable to closely overlie an external lip portion of the self-supporting container.

5. The full perimeter conforming liner according to claim 3, wherein said another cuff portion is foldable to closely overlie an external lip portion of the self-supporting container.

6. The full perimeter conforming liner according to claim 1, wherein at least one of said joined-together adjacent edges of the sleeve-like member is energy sealed together, and at least another one of said joined-together adjacent edges had been integrally formed together.

7. The full perimeter conforming liner according to claim 1, wherein all of said joined-together adjacent edges of the sleeve-like member are energy sealed together.

8. The full perimeter conforming liner according to claim 1, wherein all of said joined-together adjacent edges of the sleeve-like member were integrally formed together.

9. The full perimeter conforming liner according to claim 1, further including at least one energy-seal area that extends from one of said joined-together adjacent edges to its closely spaced conforming seal.

10. The full perimeter conforming liner according to claim 1, further including at least one joining seal that generally connects an end of one of said conforming seals to its closely spaced joined-together adjacent edge.

11. In combination, a full perimeter conforming liner installed within and lining and engaging the full perimeter of an inside surface of a self-supporting container, the container comprising:

a plurality of joined vertical container walls, at least two opposing ones of said walls being of a first identical length, two other opposing ones of said walls being of a second identical length, each adjacent two of said walls defining a vertical corner, and all of the container walls have approximately the same predetermined height; and the full perimeter conforming liner comprises:

at least two first panels of film material having a length which is greater than said first identical length of the container walls;

at least two second panels of film material having a length which is greater than said second identical length of the container walls;

each of said first and second panels of film material having a selected height that is greater than the predetermined height of the container walls;

said panels of film material having joined-together adjacent edges thereof to form a sleeve-like member having an unsealed mouth and in which first panels alternate with second panels;

a first conforming seal spaced closely laterally from a first one of said adjacent edges, said first conforming seal sealing one of said first panels to one of said second panels to define a first surplus film section between said first conforming seal and said first adjacent edge;

a second conforming seal spaced closely laterally from a second one of said adjacent edges, said second conforming seal sealing said second panel having the first conforming seal to another of said panels of film material to define a second surplus film section between said second conforming seal and said second adjacent edge, the first and second conforming seals being spaced apart from each other by a distance substantially the same as said first identical length of the container walls;

a third conforming seal spaced closely laterally from a third one of said adjacent edges, said third conforming seal sealing said panel having the second conforming seal to another of said panels of film material to define a third surplus film section between said third conforming seal and said third adjacent edge, the second and third conforming seals being spaced from each other by a distance substantially the same as said second identical length of the container walls;

a fourth conforming seal spaced closely laterally from a fourth one of said adjacent edges, said fourth conforming seal sealing one of said second panels to said first panel having the first conforming seal to define a fourth surplus film section between said fourth conforming seal and said fourth adjacent edge;

each of the conforming seals having a length that is less than said selected height of said panels of film material, said length of each conforming seal also being approximately equal to the predetermined height of the container walls;

a cuff portion that extends in one direction between said adjacent edges, and said cuff portion extends in another direction from approximately an end of each of said conforming seals to said unsealed mouth, said cuff portion being substantially free of said conforming seals; and a lining surface of the conforming liner, said lining surface excludes said cuff portion and is defined by said panels of film material and includes each of said first, second, third and fourth conforming seals, said lining surface excludes said first second, third and fourth surplus film sections, and said lining surface engages the full perimeter of the self-supporting container such that respective corner portions of the lining surface overlie and engage all of said respective vertical corners of the self-supporting container.

12. The combination according to claim 11, wherein the self-supporting container is rectangular in horizontal cross-section and has two opposing side walls having the first identical length and two other opposing side walls having the second identical length, and wherein said lining surface of the conforming liner is rectangular in horizontal cross-section and has two opposing said first panels having a length defined between adjacent conforming seals which is substantially the same as said first identical length of the container side walls, and said conforming liner also has two opposing said second panels having a length defined between adjacent conforming seals which is substantially the same as said second identical length of the container side walls.

13. The combination according to claim 11, further including another unsealed mouth and another cuff portion that extends between said adjacent edges, and said another cuff portion extends from approximately an opposite end of said conforming seals to said another unsealed mouth, said another cuff portion being substantially free of said conforming seals.

14. The combination according to claim 11, wherein said cuff portion is foldable to closely overlie an external lip portion of the self-supporting container.

15. The combination according to claim 13, wherein said another cuff portion is foldable to closely overlie an external lip portion of the self-supporting container.

16. The combination according to claim 11, wherein at least one of said joined-together adjacent edges of the sleeve-like member is energy sealed together, and at least another one of said joined-together adjacent edges had been integrally formed together.

17. The combination according to claim 11, wherein all of said joined-together adjacent edges of the sleeve-like member are energy sealed together.

18. The combination according to claim 11, wherein all of said joined-together adjacent edges of the sleeve-like member were integrally formed together.

19. The combination according to claim 11, further including at least one energy-seal area that extends from one of said joined-together adjacent edges to its closely spaced conforming seal.

20. The combination according to claim 11, further including at least one joining seal that generally connects an end of one of said conforming seals to its closely spaced joined-together adjacent edge.

* * * * *

UNITED STATES PATENT AND TRADEMARK OFFICE
CERTIFICATE OF CORRECTION

PATENT NO.  : 5,492,240
DATED       : February 20, 1996
INVENTOR(S) : Leonard J. Vilutis It is certified that error appears in the above-indentified patent and that said Letters Patent is hereby corrected as shown below:

```
Col. 3, between lines 34 and 35, insert the subtitle --BRIEF
       DESCRIPTION OF THE DRAWINGS--; between lines 55 and 56, insert
       the subtitle --DESCRIPTION OF THE PARTICULAR EMBODIMENTS--.
Col. 5, line 9, delete "type of".
Col. 6, line 34, "whether or low" should read --whether low--.
Col. 9, line 47, "first second," should read --first, second,--.
```

Signed and Sealed this

Fifteenth Day of October, 1996

Attest:

BRUCE LEHMAN

*Attesting Officer*         *Commissioner of Patents and Trademarks*